United States Patent
Paima

(10) Patent No.: US 10,051,468 B2
(45) Date of Patent: Aug. 14, 2018

(54) PROCESS FOR AUTHENTICATING AN IDENTITY OF A USER

(71) Applicant: Prashant G. Paima, Norwood (ZA)

(72) Inventor: Prashant G. Paima, Norwood (ZA)

( * ) Notice: Subject to any disclaimer, the term of this patent is extended or adjusted under 35 U.S.C. 154(b) by 222 days.

(21) Appl. No.: 14/892,645

(22) PCT Filed: May 21, 2014

(86) PCT No.: PCT/ZA2014/000026
§ 371 (c)(1),
(2) Date: Nov. 20, 2015

(87) PCT Pub. No.: WO2014/205461
PCT Pub. Date: Dec. 24, 2014

(65) Prior Publication Data
US 2016/0105798 A1  Apr. 14, 2016

(30) Foreign Application Priority Data
May 24, 2013 (ZA) .................... 2013/03857

(51) Int. Cl.
| H04W 12/06 | (2009.01) |
| H04L 29/06 | (2006.01) |
| H04W 12/08 | (2009.01) |

(52) U.S. Cl.
CPC .......... *H04W 12/06* (2013.01); *H04L 63/083* (2013.01); *H04L 63/0823* (2013.01);
(Continued)

(58) Field of Classification Search
CPC .. H04W 12/06; H04W 12/08; H04L 63/0823; H04L 63/083; H04L 63/0876; H04L 63/105
See application file for complete search history.

(56) References Cited

U.S. PATENT DOCUMENTS

| 2002/0031225 A1 | 3/2002 | Hines |
| 2002/0112156 A1* | 8/2002 | Gien ............... G06F 21/645 |
| | | 713/156 |

(Continued)

FOREIGN PATENT DOCUMENTS

| EP | 1351467 A2 | 10/2003 |
| GB | 2338381 | * 12/1999 |

(Continued)

OTHER PUBLICATIONS

Kogl, C, International Application No. PCT/ZA2014/000026, "International Search Report," dated Mar. 6, 2015, 4 pages.

*Primary Examiner* — Saleh Najjar
*Assistant Examiner* — Devin E Almeida
(74) *Attorney, Agent, or Firm* — LaBatt, LLC

(57) ABSTRACT

The invention provides a process for authenticating an identity of a user accessing a location in a secure manner using a communications device that is in direct communication with an independent server and in secondary communication with a second server, the communications device having a user interface and an input module, the process including the steps of hosting device information on the independent server for validation; generating and sending a user prompt from the device to the independent server for validation, and if validated as correct, creating a device ID and transaction ID as indexes to identify the device on the database; generating a randomised keypad on the user interface; inserting and submitting a pass code by way of the randomised keypad; relaying said pass code to the second server; and generating a second validation at the second server, using the pass code and thereby authenticating both user and device.

20 Claims, 4 Drawing Sheets

(52) U.S. Cl.
CPC ........ *H04L 63/0876* (2013.01); *H04L 63/105* (2013.01); *H04W 12/08* (2013.01)

(56) References Cited

U.S. PATENT DOCUMENTS

| | | | |
|---|---|---|---|
| 2003/0188195 A1* | 10/2003 | Abdo | G06F 13/107 |
| | | | 713/169 |
| 2011/0197266 A1 | 8/2011 | Chu et al. | |
| 2014/0156531 A1* | 6/2014 | Poon | G06Q 20/4016 |
| | | | 705/44 |
| 2014/0189808 A1* | 7/2014 | Mahaffey | H04L 63/083 |
| | | | 726/4 |
| 2014/0230017 A1* | 8/2014 | Saib | H04L 63/0823 |
| | | | 726/4 |
| 2014/0230038 A1* | 8/2014 | Leong | H04L 9/3215 |
| | | | 726/7 |
| 2014/0282964 A1* | 9/2014 | Stubblefield | H04L 63/0853 |
| | | | 726/7 |
| 2015/0038120 A1* | 2/2015 | Larkin | G06Q 20/3223 |
| | | | 455/411 |

FOREIGN PATENT DOCUMENTS

| | | | |
|---|---|---|---|
| GB | 2338381 A | | 12/1999 |
| GB | 2388229 | * | 11/2003 |
| GB | 2388229 A | | 11/2003 |
| WO | 2012009334 A1 | | 1/2012 |

* cited by examiner

PROCESS FOR AUTHENTICATING AN IDENTITY OF A USER

FIELD OF THE INVENTION

This invention relates to a process for authenticating an identity of a user. This authentication may be used in any instance wherein a user wishes to access a location in a secure manner. In particular, for any secure transaction, including, but riot limited to financial transactions an more particularly, but not exclusively, the process relates to financial transactions conducted over a secure communications network for a banking needs, for example corporate banking, internet banking, foreign exchange as well as merchant purchases.

BACKGROUND TO THE INVENTION

Financial transactions conducted over a communication s network is widely know and widely used. It is characterised by ease of use and accessibility.

Despite the potential ubiquitous application of a cashless society established through electronic transactions, many potential end-users opt to instead maintain the use of cold hard cash to effect transactions. This may be due to a lack of trust in communicating information relating to such transactions over a communications network, whether wifeless or fixed. It is well-known that communications networks may be vulnerable to security breaches with the result that information carried through these networks may be subject to third party interception and subsequent misuse.

Although electronic payment systems are currently driven by banks, these banks are unable to guarantee the security of information in relation to electronic payments that is communicated between itself and an end user or a third party. However, security issues and management of electronic transactions are by and large left to the end user. Typically end users face electronic threats such as spoofing, phishing and viruses. It is common knowledge that the risk of cyber attack and interception is borne by the consumer, if inadequate and irregular internet security levels are maintained. The uncertain and burden of risk placed upon the shoulders of an end user, and lack of technical expertise in internet security issues in the collective may represent a bar to the universal and confident use and acceptance of electronic payment systems. Recent statistics demonstrate that a low percentage of banking clients use electronic channels to facilitate payments.

The cost of banking electronically has the added expense of pricey security software programs that a user is obliged to incur. This may represent a further reason against the use of electronic banking products.

A further disadvantage that may rank against the use of electronic banking is that banks limit their own liability towards their clients by making no guarantees to the safe, secure and foolproof use of their electronic banking platforms. Monthly banking fees payable by electronic banking clients may include further fees for the use of the internet platform, as well as additional transaction fees for the services offered on the platform.

A yet further disadvantage that may be associated with currently used electronic banking systems is that unauthorised transactions are not flagged and recorded, unless a user lodges a formal complaint. Unauthorized third party use of a banking account via electronic channels may be effected multiple times before an end use notices the existence of unauthorized transactions and intervenes. The process to reverse such transactions is cumbersome and monetary loss is borne by either the consumer, the bank, or both.

OBJECT OF THE INVENTION

It is accordingly an object of the present invention to provide a process for authenticating an identity of a user for any instance wherein the user wishes to access a location in a secure manner, with which the above-mentioned disadvantages may be overcome or are at least minimised.

It is a further object of this invention to provide a new and useful alternative to existing authenticating systems and methods.

SUMMARY OF THE INVENTION

In this description, any reference to the word "location" means a platform accessible via a communications network using a communications device, which platform facilitates access to secure, confidential or encrypted information, preferably located remotely to the communications device.

According to the present invention, there is provided a process for authenticating an identity of a user accessing a location in a secure manner using a communications device brat is in direct communication with an independent serer and in secondary communication with a second server, where in the communications device has a user interface and an input module, the process including the steps of:

i) hosting device information on the independent server for validation;

ii) generating and sending a user prompt from the device to the independent server, which prompt is validated by comparing the user prompt to the device information, and, if validated as correct, creating a device ID and transaction ID as indexes to identify the device on the database;

iii) generating a randomised keypad on the user interface;

iv) inserting and submitting a pass code byway of the randomised keypad;

v) relaying said pass code to the second server; and vi) generating a second validation at the second server, using the pass code and thereby authenticating both user device.

In one embodiment of the invention, device information includes, but is not limited to one or more of, user name, user SIM card number (including mobile number attached to the SIM card), device make, device model, device OS platform, device serial number, device MAC address, device IP address, user location (geographical code), device IMEI, ICCID and System Identification Number of the communication device.

In a second embodiment of the invention, should the device information be validated as either new or incorrect, as in step ii), the process then includes the further steps of:

A. generating a request to the user to submit security information;

B. inputting and transferring security information and the device information from the device to the independent server and the second server;

C. storing the device information on the independent server;

D. validating security information by the second server;

E. if security information is validated as existing on second server the second server generating and communicating a request for user identity validation;

F. inputting user identity information, which if validated as correct, generating and sending a request to confirm device information with user;

G. inputting device information via the device to the second server, which if correct, storing said device information on the independent server as authenticated; and H. granting access of said device to step iii).

In a further embodiment of the invention, security information includes but is not limited to user's identity number, business registration number, or any other code or detail that is unique to the user.

In a yet further embodiment of the invention, in the event of security information being validated as not existing, or the user identity being incorrect then further communication between the independent server, second server and user is terminated.

According to a second aspect of the invention, an additional step I) is provided for after step iii) wherein the step I includes:

I. encrypting the randomized keypad such that an encrypted value is assigned for each key on the keypad.

In the invention, a randomised keypad is generated by displaying a digital keypad on the user interface. The randomized keypad presents as a shuffling of the input access keys of the digital keypad, to a configuration that is different to what is presented in convention keypads.

In yet a further embodiment of the invention, an additional step J) is provided for after step I), the step including:

J. user entering and submitting a secret combination of alpha-numeric characters via the software banking programme on the communication device.

In a preferred embodiment of step i), the secret combination is a plurality of words comprising at least five characters, more preferably each word having a maximum of 20 characters.

In yet a further embodiment of the invention, step E) is performed by an authorised representative in communication with the second server. Preferably, the authorised representative makes direct contact with the user. More preferably, the authorised representative makes direct contact with the user telephonically.

in an additional embodiment of the invention, a further step taking place after step H) or, if step J) is present, after step J), the further step including:

K. displaying a security certificate on the user interface.

In a preferred embodiment of step K), the security certificate includes a mark in the form of a device, word, or combination thereof. More preferably, the mark includes at least one of the secret words making up the secret combination.

In an embodiment of the invention, upon the randomised keypad being generated, keypad keys and the transaction ID are communicated from the independent server to the communication device and displayed on the interface, simultaneously the keypad keys, transaction ID and device ID are communicated to the second server from the independent server.

In a preferred embodiment of the invention, the randomised keypad will be regenerated on each occasion that the user is required to provide user credentials. In a more preferred embodiment, values of keypad keys are encrypted by the second server and communicated to the communication device via the independent server. In an even more preferred embodiment, the encryption is in the form of not more than five alphanumeric characters.

In another embodiment of the invention, the inserting of the pass code is achieved through the user using the input module, wherein the input module may be a mouse, touch screen, stylus, or trackball.

In a preferred embodiment of steps iii), iv) and v) the pass code is an encrypted pass code and a deciphering step is required by the second server prior to validating the pass code.

In a final embodiment of the invention, the user and device are only authenticated if all of the user ID, device ID and pass code match those required by the second server.

BRIEF DESCRIPTION OF THE DRAWINGS

The invention will now be described further by way of non-limiting examples with reference to the accompanying drawings wherein.

DETAILED DESCRIPTION OF THE INVENTION

Figure 1:
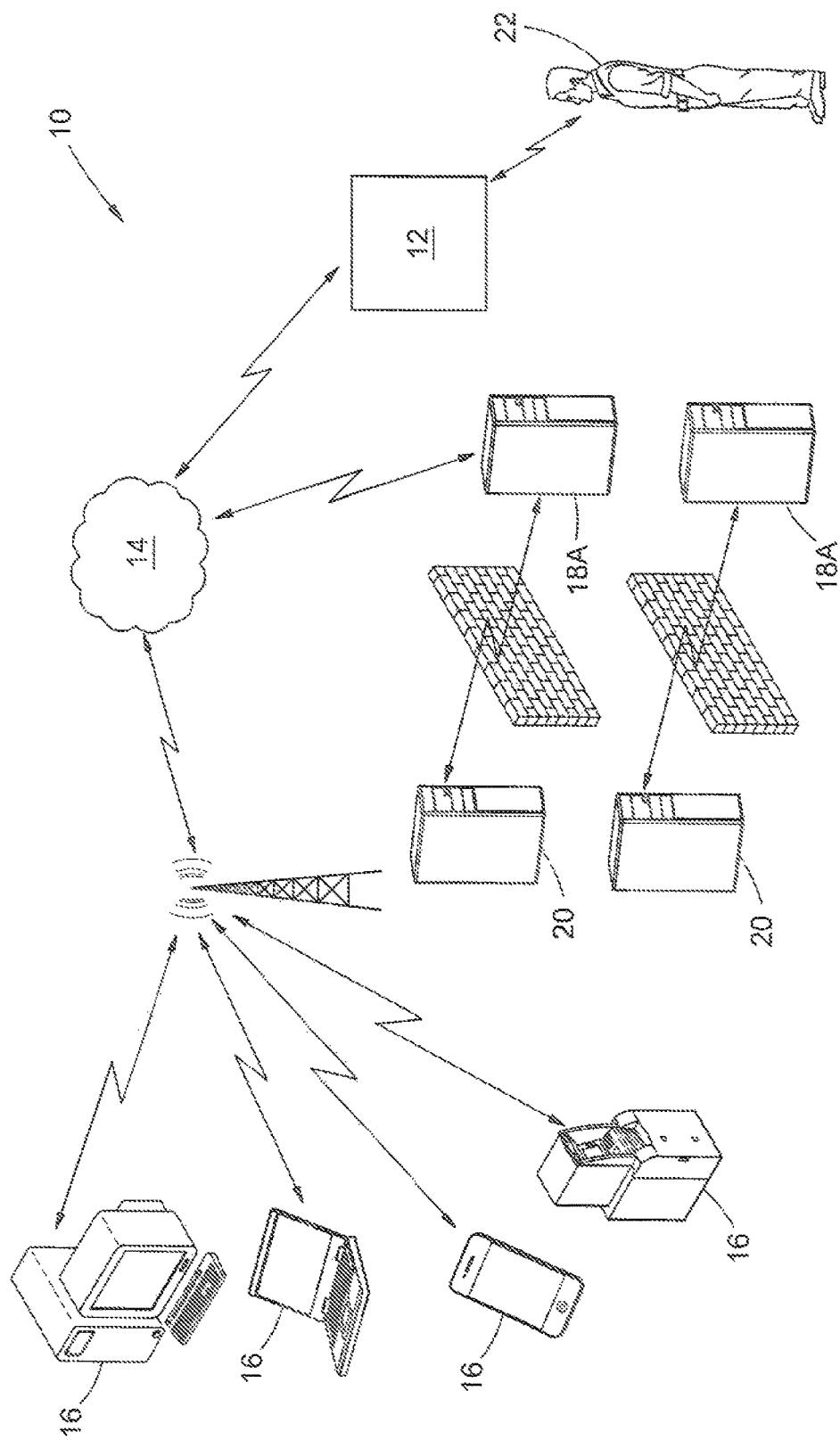
FIG. 1 is a schematic diagram illustrating a system required for the process of the invention to be operational.

In order for the process, according to the invention, to be functional, it requires a suitable system on which it may operate. A brief outline of such a system is described below with reference to FIG. 1.

In this regard, the system for conducting financial transactions is generally designated by reference numeral 10. It must be borne in mind that other types of transactions are possible and the below description merely describes in broad terms a process according to the invention as it would be applied to a financial transaction. In general, a very similar process could be applied to other applicable transactions.

The system 10 for conducting financial transactions includes an independent server (hereinafter referred to as "AIR server") 12 in communication with a communications network 14. The communications network 14 is in further communication with a plurality of communication devices 16 and third party second server, hereinafter referred to as financial servers 18. The communications device 16 has a processor (not shown), a memory module (not shown) for storing a software banking programme, and an input module having an input means that allows access to the software banking programme, and execution of financial transactions via a user interface located on the communications device 16.

The system 10 is accessed by launching software banking programme on the communication device 16. The software banking programme is also contained on the AIR server 12 and financial servers 18. Ideally, the software banking programme is also contained on a financial institutions database 20, wherein device information is stored on the AIR server 12 and user information on the financial server's 18 database.

Figure 2:
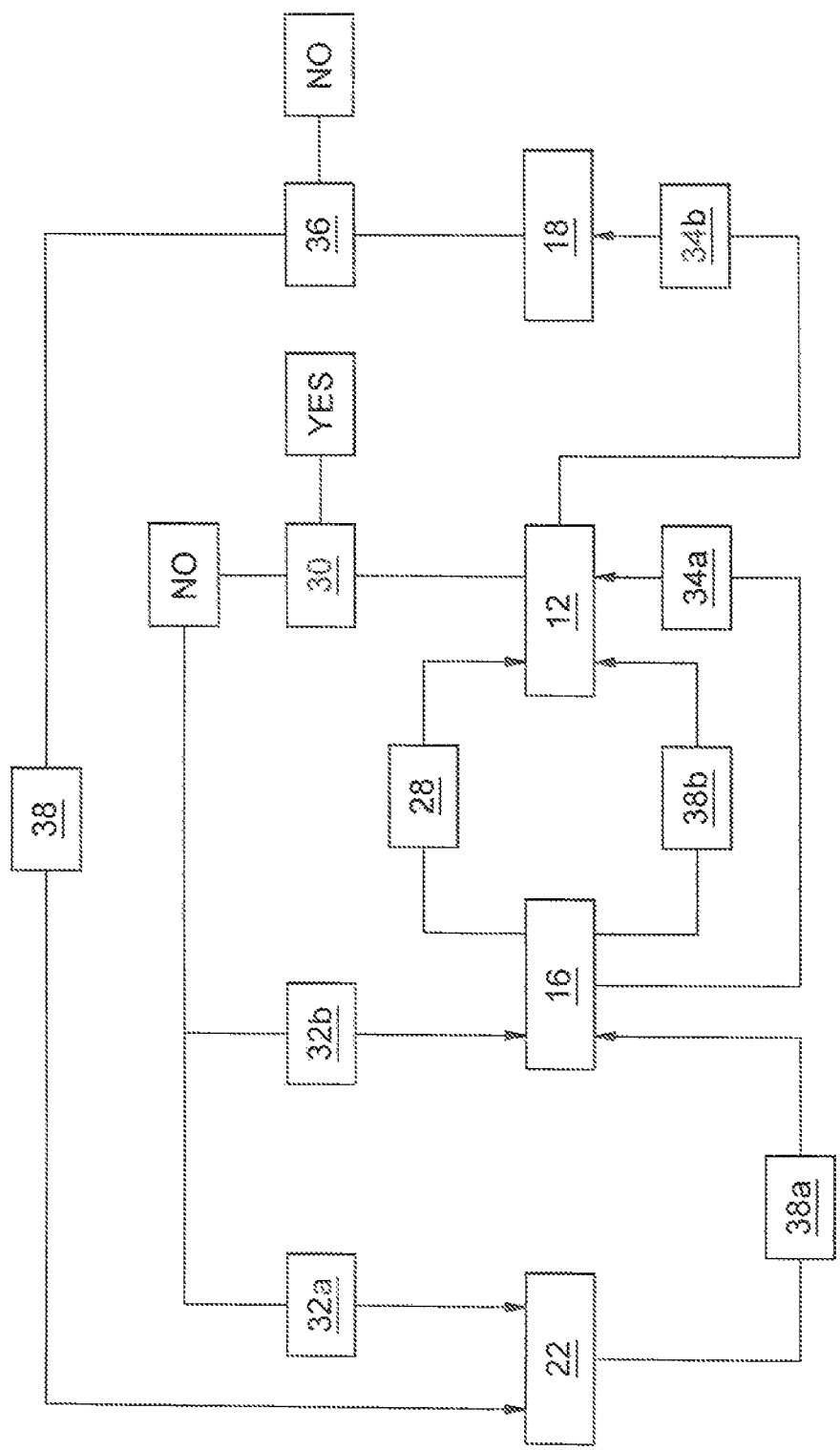
FIG. 2 is a schematic flow diagram illustrating the initial preferred steps according to the invention.

With this system in place, the process according to the invention can now be described in greater detail and with reference to FIG. 2.

Figure 3:
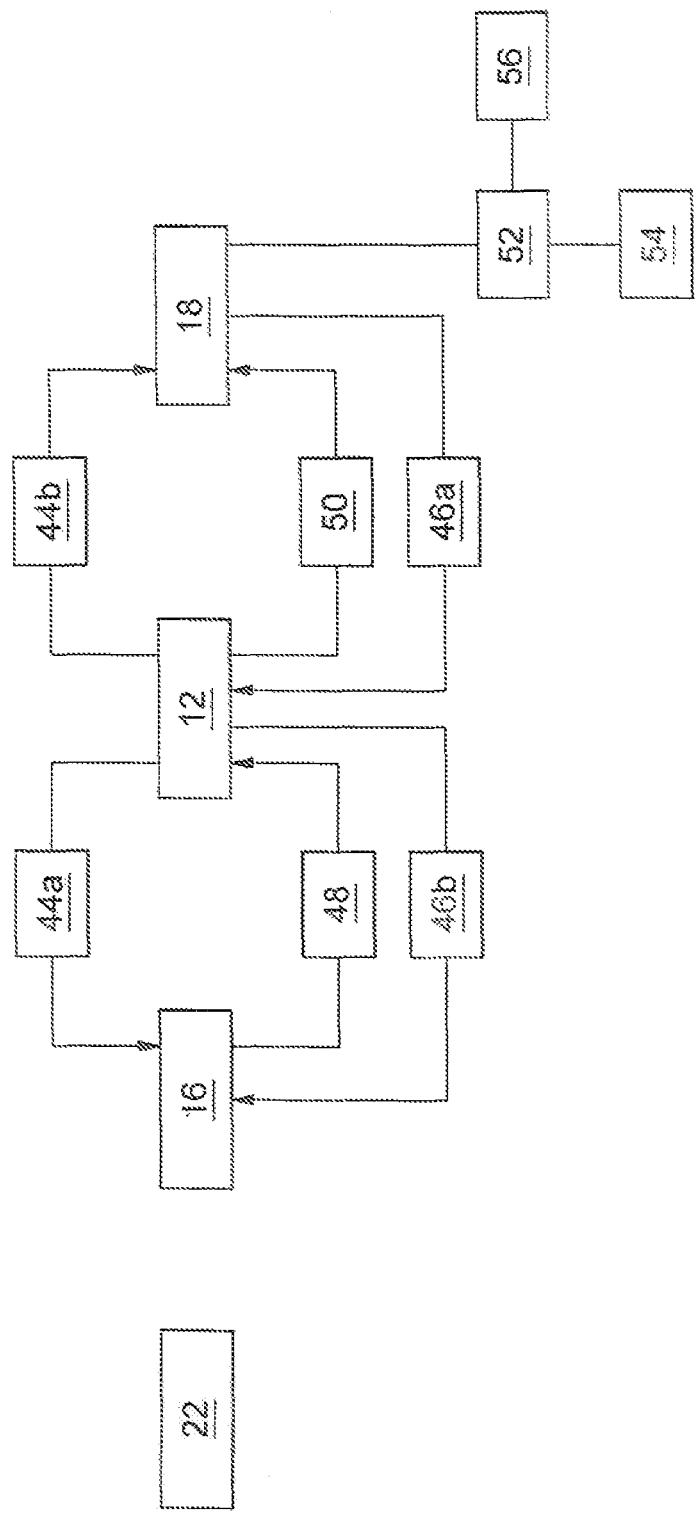
FIG. 3 is a schematic flow diagram illustrating the later steps according to the invention.

For ease of reference the entire process according to the invention has been broken down into FIG. 2 (which is referred to below as the registration stage) and FIG. 3 (access stage).

Registration Stage

In the event that a user 22 proceeds to a financial institution's, such as a bank, access point, such as a website for internee banking, details regarding the user communications device o are simultaneously extracted and transferred 28 through to the AIR server 12 for validation 30. Such extracted and transferred information can include, but is not limited to, the name, phone number, make, model, OS platform, serial number, MAC address, IP address, location (geographical code), IMEI, ICCID and System Identification Number of the communication device 16. The AIR server 12 will use this received information to confirm whether such information matches stored information on the AIR server 12.

Device Already Registered with AIR Server

The AIR server will create a device ID using some or all of the transferred information, however, this information could be narrowed down to make, geographical location, operating platform or MAC address. This device ID will be used to extract device information stored on the AIR server 12 and confirm that the information retrieved matches the stored information.

Similarly a transaction ID will also be created by the AIR server 12. To create this transaction ID, the MAC Address and Datetime Stamp is used, though the geographical code may also be included.

Device Requires registration with AIR Server

Should the extracted and transferred information not match information stored on the AIR server a request 32 is sent to the user 22 to capture user information, such as the user's identity number, business registration number etc., and information relating to the communications device 16 such as device make, device model, device OS platform. This captured information as well as device information is then transferred to the AIR server 12, and stored, and to the financial server 18.

If, upon validation 36, the information relating to the user 22 is not found on the financial server 18, then this will end the communication. It could be possible to advise the user 22 of this error.

However, if the information matches information on the financial server 18 then a duly authorised representative will preferably make contact with the user 22 by way of calling the user 22 on a telephone 38. This call serves a dual purpose of first verifying that the user 22 was in fact attempting to access his/her account or to allow a user 22 to link the communication device 16 (or additional such devices) for access to his/her account. In the event that a user 22 wishes to add the communication device 16 as an authorise devices in the future, the user 22 will first need to satisfy the representative that the user 22 is in fact the same person/entity matching the stored information on the financial server 18. This may be done by asking the user 22 to answer certain specific security questions including, but not limited to the users identity number, home address, telephone number etc. Once this has satisfactorily been done, the authorised representative will authorise this particular device (using the received communication device information) to be used in the future to access the user account 54.

Once a communication device 16 has had its details registered with the financial server 18, the user 22 will be prompted to capture a secret combination (AIR access code) on the communication device 16 and to transmit this AIR access code to the independent server 12. This act takes place using the aforementioned software banking programme.

With reference to the AIR access code, the AIR access code can comprise any arrangement of characters, though it is preferred that it is rather a set of words. Ideally, the AIR access code is made up of five letter words, with each word having a maximum of 20 characters as in the below example:

steve money bacon apple enrol

It is then the prerogative of the user 22 to keep these AIR access codes confidential or to continuously change them so as to reduce the chance of an unauthorised person having access to the AIR server under the user's ID.

It is important to remember that access to the AIR server is dependent on the user using a communication device 16 which has details that match information stored on the AIR server.

Once the communication device 16 is registered, the steps as set out above in "Device already registered with AIR server" will take place.

Security Certificate

When the user 22 uses the software banking programme in future (and using a registered communication device 16), the AIR server will first validate such communication device. Once validated, a security certificate will appear on the interface of the communication device. This certificate could include an identity unique to the software banking programme. For instance "PAIMA".

One of the five secret words used for the AIR access code will then be displayed in conjunction with the PAIMA security certificate. Which of the five words to be displayed will be random and will change haphazardly each time the user 22 uses the communication device 16 and software banking programme to try and access the user's account 54. For example, using the aforementioned AIR access code, the following security certificate may be displayed:

bacon$^{PAIMA}$

If the user 22 sees this security certificate, the user 22 can have more confidence to proceed with further validation checks without fear that the user 22 has inadvertently been rerouted to an unsolicited website which could capture future confidential information.

Access Stage

Figure 4:
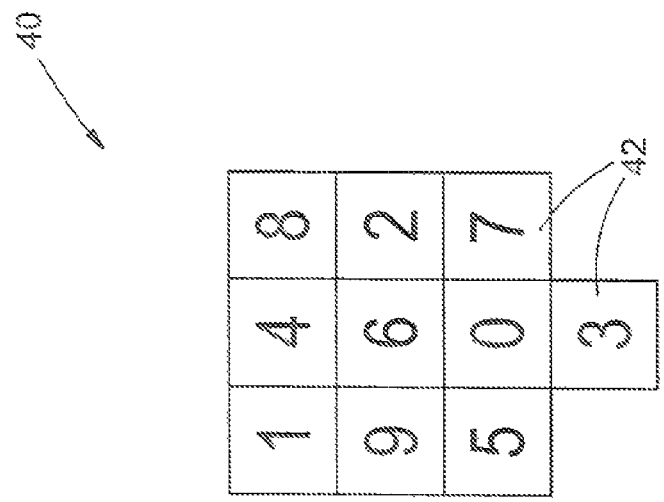
FIG. 4 is a diagram of an example of generated randomised keypad.
Figure 4:
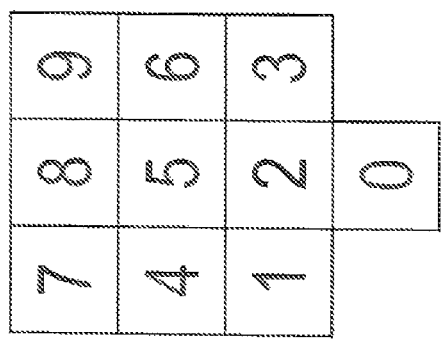

The next step of validation includes the creation of a randomised keypad (as seen in FIG. 4) on the interface of the communication device 16. This randomised keypad 40 has, as a purpose, a further security means to prevent an unwanted third party, who may have access to the communication device through previously installed Spyware and other such programs from stealing inserted values.

The creation of the randomised keypad occurs once the communication device 16 is validated by the AIR server 12.

The randomised keypad 40 is created with jumbled keypad keys 42. The randomised keypad 40 will have a set of ten digits that represent the numeric keypad stored in a string or ten images that represent the numeric keypad stored in a blob. This string or blob, which may include alphanumeric characters or images, will initiate the location of the keypad keys 42 of the respective ten digits on a normal keypad by randomly selecting a specific digit/value/image within a particular position on the keypad and then repeating this process for ten iterations. Once the keypad keys 42 are generated, the keypad keys 42 and transaction ID are passed 44a to the communication device 16 and the keypad keys 42, transaction ID and device ID to the financial server 18, 44b from the AIR server 12. The randomised keypad 40 is then displayed on the interface of the communication device 16.

In summary, the software banking programme generates the randomised keypad 40 by jumbling numbers 0 to 9 of as normal keypad in a random order and displaying such values in random positions. An example of such randomised keypad 40 is illustrated in FIG. 4. Furthermore, the values of the keypad keys 42 are further encrypted.

In order for this encryption to occur, assigned keypad key values along with the transaction ID is passed to the communication device 16, from the financial server 18 via the AIR server 12 (46a, 46b). The financial sever 18 will select the length of the alphanumeric value (with a maximum of five characters, as in below example) to be generated randomly and assigned to the respective keypad key values.

For instance, the following randomised alphanumerical value could be assigned to the res dive keypad key value:

1=a2Efg; 2=br7H9; 3=rT7o9; 4=A6Rrc; 5=9LiPe; 6=n24Wc; 7=JhGTq; 8=Y736b; 9=1Vn7y: 0=z8nT6

Should the user's pass code be 2255, and this pass code is entered and submitted by easy of the randomised keypad 40, a keypad key string value (encrypted pass code) of or br7H9 br7H9 9LiPe 9LiPe will be transmitted 48 along with the transaction ID to the financial server 18 via the AIR server 12.

The pass code can be entered on the randomised keypad 40 through the user using the input module, wherein the input module may be a mouse, touch screen, stylus or trackball.

The AIR server 12 then transmit 50 the transaction ID, device ID, user ID and encrypted pass code to the financial server 18. A module 52 placed on the financial server 18 will then be used to decipher the encrypted pass code and determine whether, when deciphered, it matches the required pass code, username and device ID.

If the pass code, username and device ID match those of the financial server 18 for this particular transaction, then authentication is passed and the user 22 granted access to the user account 54. If the pass code does not match, authentication is rejected and the user 22 is declined access 56 to the user account 54.

It will be appreciated that variations in detail are possible according to the invention without departing from the scope of this disclosure.

The invention claimed is:

1. A process for authenticating an identity of a user accessing a location in a secure manner using a communications device that is in direct communication with an independent server and in secondary communication with a second server, wherein the communications device has a user interface and an input module, the process including the steps of:
   i. hosting device information on the independent server for validation;
   ii. generating and sending a user prompt from the device to the independent server, which prompt is validated by comparing the user prompt to the device information, and, if validated as correct, creating a device ID and transaction ID as indexes to identify the device on the database;
   iii. generating a randomised keypad on the user interface;
   iv. inserting and submitting a pass code by way of the randomized keypad;
   v. relaying said pass code to the second server; and
   vi. generating a second validation at the second server, using the pass code and thereby authenticating both user and device;
   and wherein the randomized keypad is re-generated on each occasion that the user is required to provide user credentials, and where values of keypad keys are encrypted by the second server and communicated to the communication device via the independent server.

2. The process for authenticating an identity of a user as claimed in claim 1, wherein device information includes one or more of user name, user SIM card number (including mobile number attached to the SIM card), device make, device model, device OS platform, device serial number, device MAC address, device IP address, user location (geographical code), device IMEI, ICCID and System Identification Number of the communication device.

3. The process for authenticating an identity of a user as claimed in claim 1, wherein if device information is validated as either new or incorrect, as in step ii), the process including the further steps of:
   A. generating a request to the user to submit security information;
   B. inputting and transferring security information and the device information from the device to the independent server and the second server;
   C. storing the device information on the independent server;
   D. validating security information by the second server;
   E. if security information is validated as existing on second server the second server generating and communicating a request for user identity validation;
   F inputting user identity information, which if validated as correct, generating and sending a request to confirm device information with user;
   G. inputting device information via the device to the second server, which if correct, storing said device information on the independent server as authenticated; and
   H. granting access of said device to step iii).

4. The process for authenticating an identity of a user as claimed in claim 3, wherein step is E) is performed by an authorized representative in communication with the second server, more preferably wherein the authorised representative makes direct contact with the user telephonically.

5. The process for authenticating an identity of a user as claimed in claim 3, including a further step K) following from step H), the further step K) including:
   K. displaying a security certificate on the user interface.

6. The process for authenticating an identity of a user as claimed in claim 1, wherein security information includes user's identity number, business registration number, or any other code or detail that is unique to the user.

7. The process for authenticating an identity of a user as claimed in claim 3, including the further step of terminating further communication between the independent server, the second server and the user, in the event of security information being validated as not existing, or the user identity being incorrect.

8. The process for authenticating an identity of a user as claimed in claim 1, including an additional step I) provided for after step iii) wherein the step I includes
   I. encrypting the randomized keypad such that an encrypted value is assigned for each key on the keypad, and wherein the randomized keypad is generated digitally on the user interface.

9. The process for authenticating an identity of a user as claimed in claim 8, wherein the digitally generated randomized keypad presents as a shuffling of input access keys in a configuration that is different to conventional keypads.

10. The process for authenticating an identity of a user as claimed in claim 8, wherein the step I) includes additional step J), comprising:
   J. entering and submitting a secret combination of alphanumeric characters by the user via a software banking program on the communication device, and wherein the secret combination is a plurality of words comprising at least five characters, more preferably comprising a maximum of 20 characters.

11. The process for authenticating an identity of a user as claimed in claim 1, wherein the keypad keys and the transaction ID communicated from the independent server to the communication device and displayed on the interface, whilst the keypad keys, transaction ID and device ID are communicated in real time to the second server from the independent server.

12. The process for authenticating an identity of a user as claimed in claim 1, wherein the encryption includes up to five alphanumeric characters.

13. The process for authenticating an identity of a user as claimed in claim 1, wherein the input module is a mouse, touch screen, stylus or trackball.

14. The process for authenticating an identity of a user as claimed in claim 1, wherein the pass code is an encrypted pass code and a deciphering step is required by the second server prior to validating the pass code.

15. The process for authenticating an identity of a user as claimed in claim 1, wherein the user and device are authenticated if all of a user ID, the device ID and the pass code match those defined by the second server.

16. A process for authenticating an identity of a user accessing a location in a secure manner using a communications device that is in direct communication with an independent server and in secondary communication with a second server, wherein the communications device has a user interface and an input module, the process including the steps of:
  i. hosting device information on the independent server for validation;
  ii. generating and sending a user prompt from the device to the independent server, which prompt is validated by comparing the user prompt to the device information, and, if validated as correct, creating a device ID and transaction ID as indexes to identify the device on the database;
  iii. generating a randomised keypad on the user interface;
  iv. inserting and submitting a pass code by way of the randomized keypad;
  v. relaying said pass code to the second server; and
  vi. generating a second validation at the second server, using the pass code and thereby authenticating both user and device,
  wherein if device information is validated as either new or incorrect, as in step ii), the process including the further steps of:
  A. generating a request to the user to submit security information;
  B. inputting and transferring security information and the device information from the device to the independent server and the second server;
  C. storing the device information on the independent server;
  D. validating security information by the second server;
  E. if security information is validated as existing on second server the second server generating and communicating a request for user identity validation;
  F inputting user identity information, which if validated as correct, generating and sending a request to confirm device information with user;
  G. inputting device information via the device to the second server, which if correct, storing said device information on the independent server as authenticated; and
  H. granting access of said device to step iii).

17. The process for authenticating an identity of a user as claimed in claim 16, including the further step of terminating further communication between the independent server, the second server and the user, in the event of security information being validated as not existing, or the user identity being incorrect.

18. The process for authenticating an identity of a user as claimed in claim 16, wherein step is E) is performed by an authorized representative in communication with the second server, more preferably wherein the authorised representative makes direct contact with the user telephonically.

19. The process for authenticating an identity of a user as claimed in claim 16, including a further step K) following from step H), the further step K) including:
  K. displaying a security certificate on the user interface.

20. The process for authenticating an identity of a user as claimed in claim 19, wherein the security certificate includes a mark in the form of a device, word or combination thereof, and wherein the mark preferably includes at least one of a plurality of words making up a secret combination.

* * * * *